United States Patent [19]
Muller

[11] Patent Number: 5,183,399
[45] Date of Patent: Feb. 2, 1993

[54] DEVICE FOR TRAINING OF DIFFERENTIATION

[76] Inventor: Heiner Muller, Dorfstrabe 14, D-2152 Horneburg, Fed. Rep. of Germany

[21] Appl. No.: 629,253

[22] Filed: Dec. 18, 1990

[30] Foreign Application Priority Data

Dec. 18, 1989 [DE] Fed. Rep. of Germany ....... 8914825

[51] Int. Cl.$^5$ .......................... G09B 3/00; G09B 7/00
[52] U.S. Cl. ..................................... 434/322; 434/327
[58] Field of Search ................ 434/322, 327, 330, 338

[56] References Cited

U.S. PATENT DOCUMENTS

| | | | |
|---|---|---|---|
| 2,546,543 | 3/1951 | Jones | 434/334 |
| 2,863,226 | 12/1958 | Kelly | 434/327 |
| 3,304,627 | 2/1967 | Celia | 434/322 |
| 3,575,545 | 4/1971 | Millar | 434/338 |
| 3,613,260 | 10/1971 | Shuford, Jr. | 434/322 |
| 3,740,869 | 5/1973 | Pleasants | 434/338 |
| 4,824,376 | 4/1989 | Arash | 434/330 |

FOREIGN PATENT DOCUMENTS 2178214 6/1985 United Kingdom ............... 434/338

Primary Examiner—Gene Mancene
Assistant Examiner—Cindy A. Cherichotti
Attorney, Agent, or Firm—Dominik, Stein, Saccocio, Reese, Colitz & Van Der Wall

[57] ABSTRACT

A device for training of differentiation by coordination of symbols being of numerical, alphanumeric, word and/or pictorial in character. The symbol are arranged on the front surface of a card of plastic, cardboard or metallic foil. The symbols are arranged in two sections on the front surface of the card, the symbols in one section representing "questions" and the symbols in the other section representing "answers" to such questions. Each section is defined by a graph of colored lines printed or coded on the front surface. A plurality of clamping means are color-coded to the color of the "answer" symbols and adapted to be removably fastened over the border of the card overlapping the "question" symbols.

8 Claims, 4 Drawing Sheets

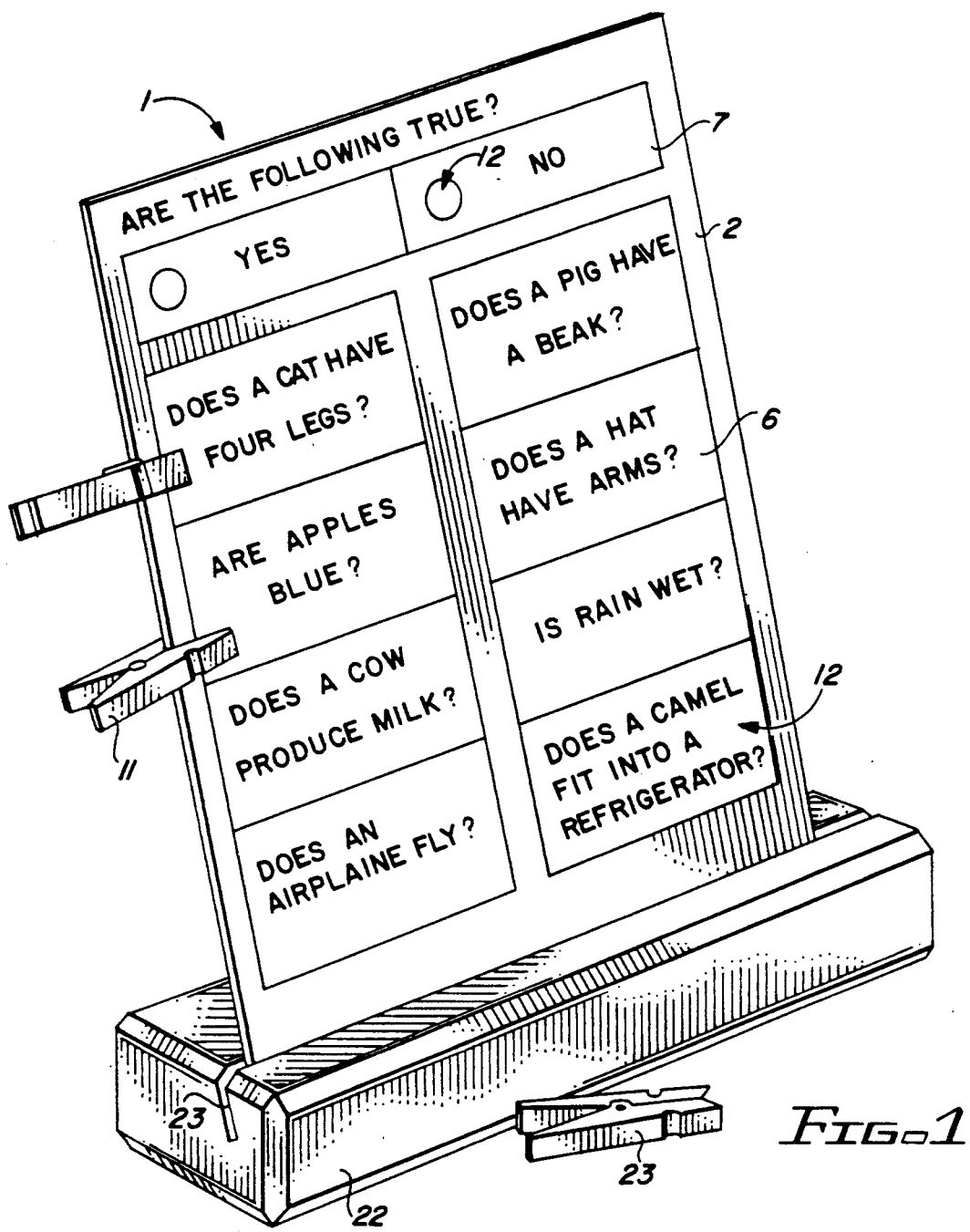
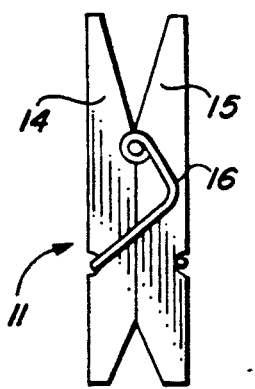 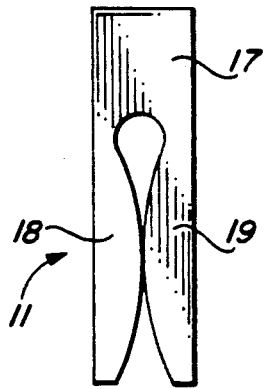 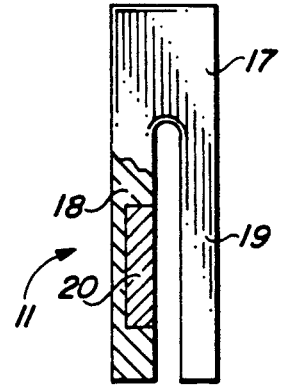

DEVICE FOR TRAINING OF DIFFERENTIATION

This invention is a device for training of differentiation by coordination of symbols being of numerical, alphanumeric, word and/or pictorial in character. The symbols are arranged on the front surface of a card of plastic, cardboard or metallic foil. The symbols are arranged in two sections on the front surface of the card, the symbols in one section representing "questions" and the symbols in the other section representing "answers" to such questions. Each section is defined by a graph of colored lines printed or coded on the front surface. A plurality of clamping means are color-coded to the color of the "answer" symbols and adapted to be removably fastened over the border of the card overlapping the "question" symbol.

It is the state of the art to arrange holes in the card through which plugs are inserted for symbolizing logical correlation of symbols. This disadvantage of using these plugs is that repeated use results in damaging of the edges of the holes in such a way that fast connection of the plugs into the holes is impossible.

Accordingly, a general desirable object of the present invention is to provide a device according to the above mentioned art which overcomes these disadvantages of the prior art devices.

This object of the invention is solved by the features of Claim 1. Advantageous further features of the invention are subject to the depending claims.

The invention is described with regard to a preferred embodiment of the invention in connection with the accompanying drawings in which:

FIG. 1 illustrates the device in a perspective view mounted in a plug-in strip;

FIGS. 7a–7c illustrate embodiments of clamping means.

Figure 3:
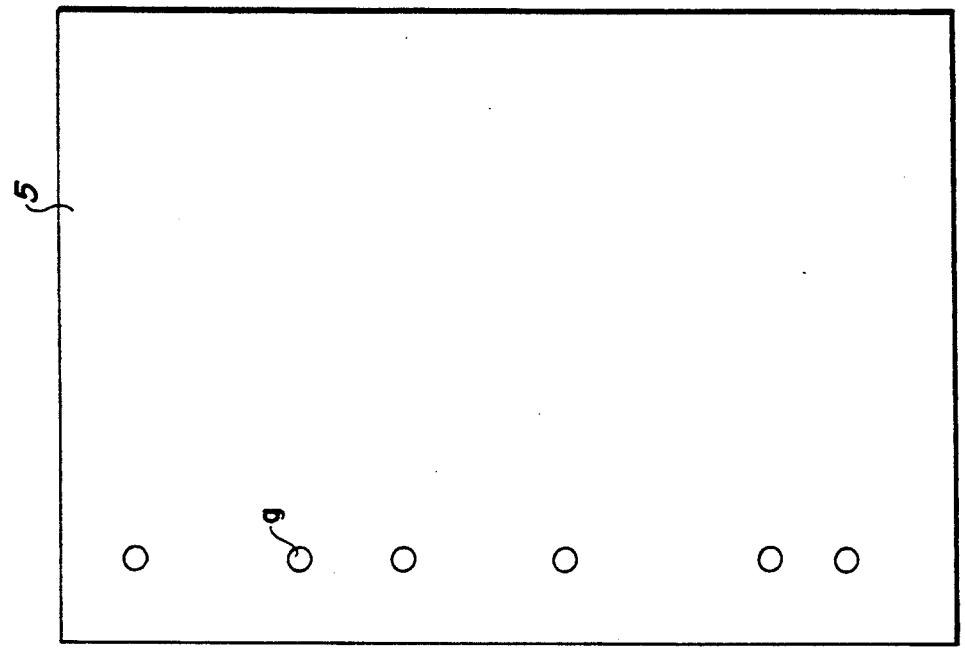
FIG. 3 illustrates the device of FIG. 2 in a view on the back surface.

The device 1 comprises a blank 3 made as a card 2 manufactured from a plastic, cardboard or metallic foil. The front area 4 of card 3 is divided into two arrangements 8 of sections 6 and 7, each of which is defined by a graph 13 of colored lines. One arrangement 8 composed of sections 7 is positioned above the other arrangement 8 composed of sections 6. Symbols 12 are positioned within each of the sections 6 and 7. The symbols 12 of section 6 are of word character presenting a "question" to be answered whereas the symbols 12 of section 7 are of pictorial character and of numerical character representing an "answer" to the questions presented. More specifically, the symbols 12 of section 7 may comprise circle configurations, each differently colored to enable differentiation. Colorization may be made by overprinting or coding; however, it is possible to make the circles in neutral color which may then be subsequently colored by the use of a pastel or paint brush in the desired color. Clamping means 11 are removably fastened to at least one border 10 of the card 12. The clamps 11 are color-coded to correspond to the colors of the symbols 12 of section 7. On the back surface 5 of the card 2, symbols 9 are aligned with the symbols 12 of the "question" section 6 on the front surface and are color-coordinated to represent the "correct" answer to such question, allowing the user to easily ascertain whether a clamp 11 of a particular color representative of a particular "answer" thereby is "correct" indicating that the user of device 1 was able to answer the question correctly.

Figure 5:
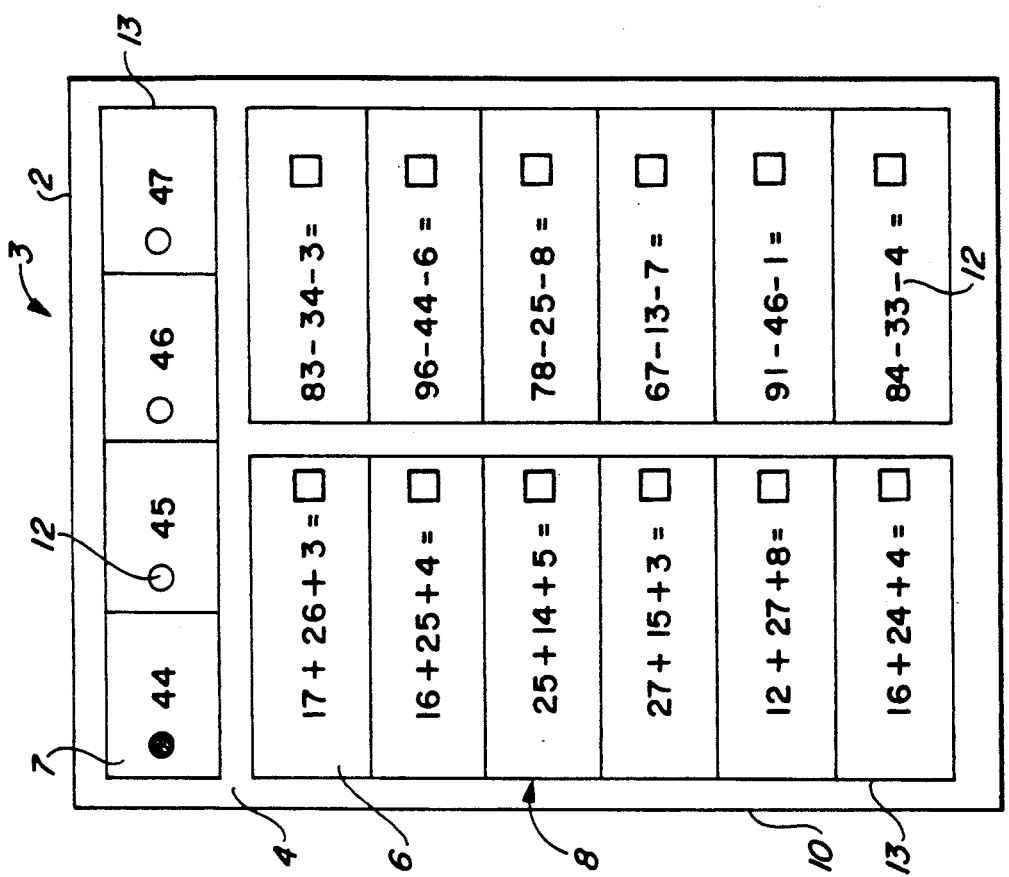
FIGS. 4–6 illustrate further embodiments of a device in a view on the front surface.
Figure 4:
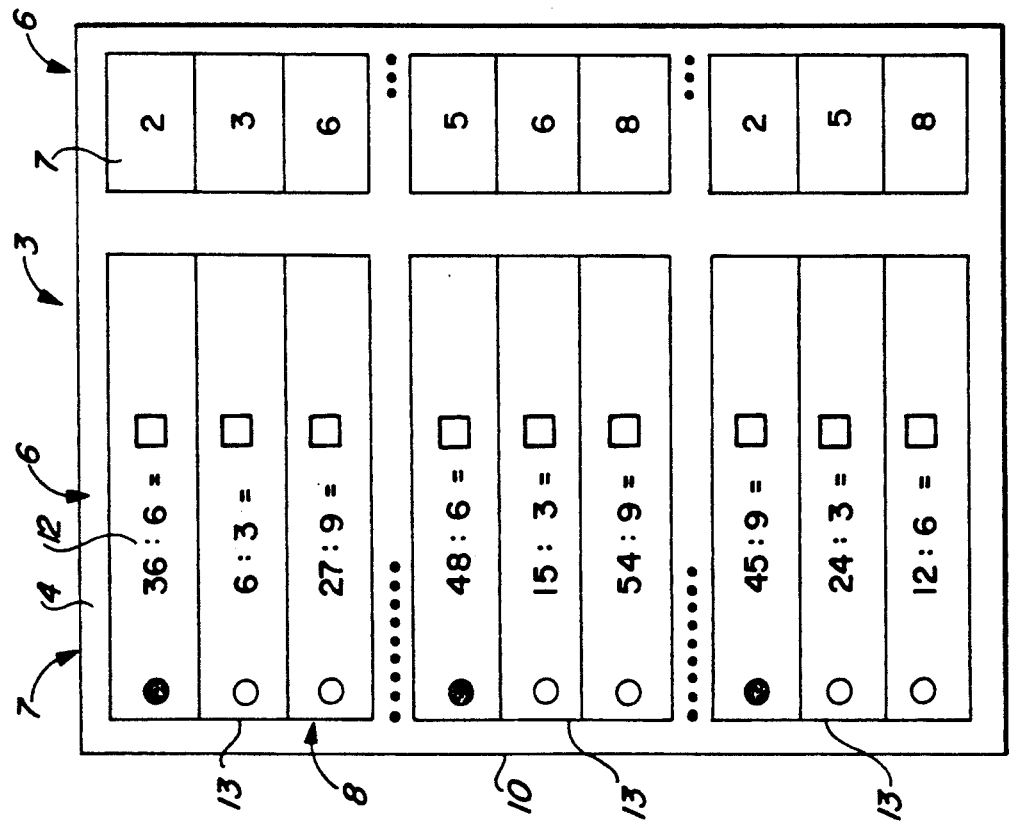
Figure 6:
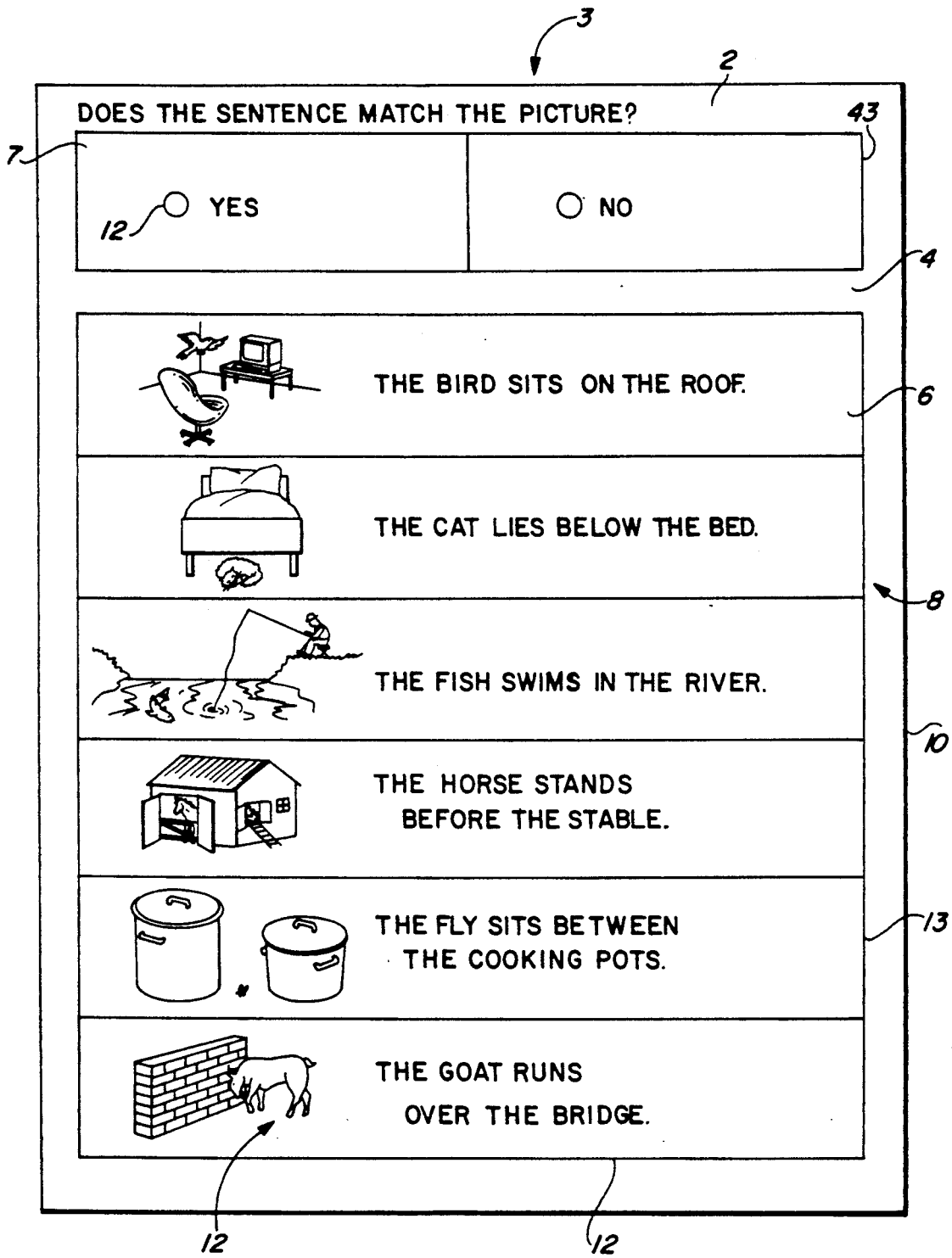

It is possible to integrate section 7 into section 6 as shown by device of FIG. 4. Symbols 12 may be of numeric, alphanumeric, word and/or pictorial character. Section 6 and section 7 may be arranged differently as demonstrated by comparison of devices 1 shown in FIG. 2, 4 and 5. FIG. 6 shows a modification of device 1 which is likewise used for reading in word sections. In this case, section 6 has symbols made of words and pictures.

The sections 6 and 7 may be integrated into linear or vertical arrangements 8. It is even possible to design the sections 6 or 7 well above or below the other sections 7 or 6.

The devices described herein are ideal teaching materials for training of differentiations which may be prepared for instruction with little expenditures. The symbols 12 (i.e. circles) on cards 2 may be laid out in different colors. Choice of color has to be made in such a way that persons being color-blinded or insecure in recognition of colors are able to distinguish the colors clearly. For solution of an appropriate problem or "question" symbol, a clamp with a corresponding color of one of the "answer" symbols 12 of section 7 is clamped on to the edge 10 of the card 10 adjacent to the "question" symbol. The card 2 may then be turned around to view its back surface 5. On the back surface 5 are circles 9 corresponding to the correct answer to the question. Thus, if there is conformity between the color of the clamp 11 and the color of the circle 9, the selected "answer" is correct. Otherwise, another attempt should be made.

The clamps 11 may be designed in a different manner. It is possible to construct each clamp 11 as well known of two clamp-pieces 14 and 15, which are connected by a spring 16. At quiescent condition the clamp pieces 14 and 15 are pressed upon each other by force of the spring 16 (FIG. 7a). By touching the end pieces of clamp pieces 14 and 15 the clamp 11 can be connected with the card 2.

It is even possible to design the clamp 11 as shown in FIG. 7b. In this case, webs 18 and 19 are constructed on a basic body 17 which are attached to one another in an elastic manner. If required, a card 2 may be pushed between webs 18 and 19. However, it is possible to integrate a permanent magnet 20 into one of the webs 18 or 19 (FIG. 7c). This construction of a clamp 11 is suitable for such cards 2 with a blank 3 of a metallic foil or a thin plate, on which magnets are able to adhere.

Figure 2:
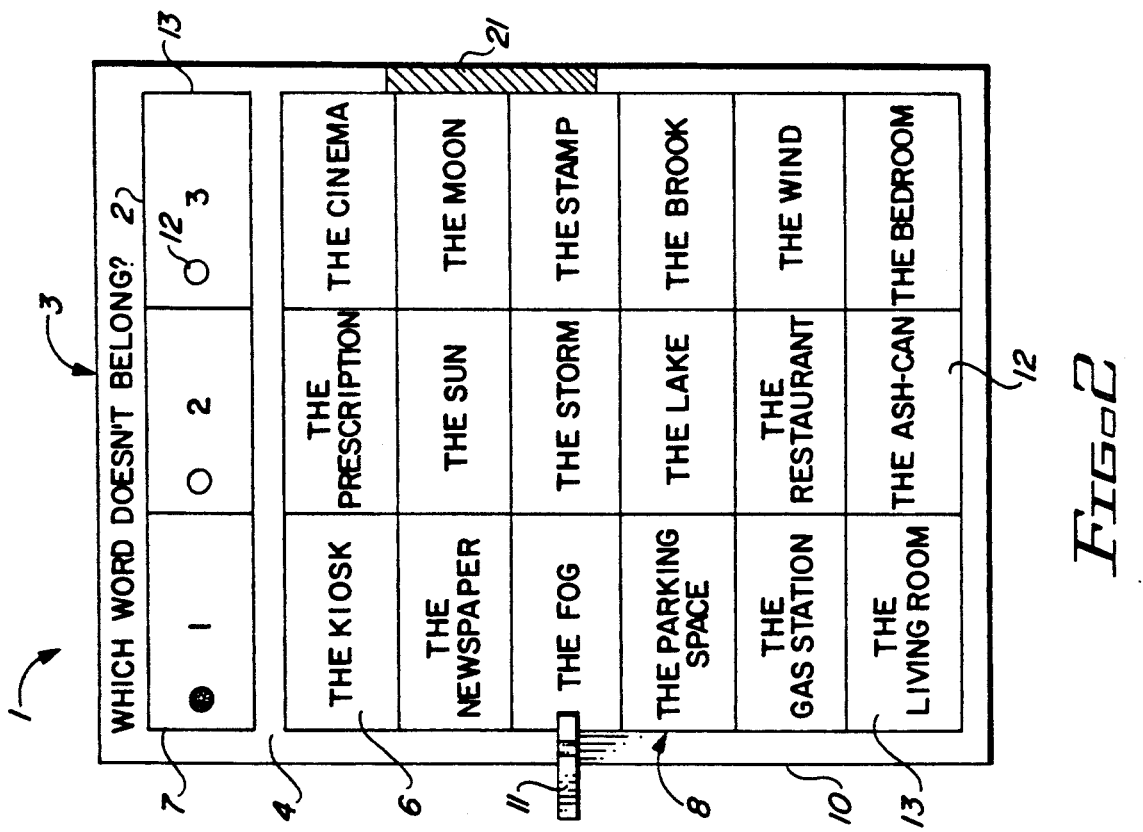
FIG. 2 illustrates the device in a view on the front surface.

For protection of card borders 10 against damage by wear, it is possible to arrange a stiffening foil 21 at the card border 10 being indicated at FIG. 2 by hatched lines. Stiffening foil 21 may be of cloth or the like and encompasses card borders 10. The stiffening foil 21 is fixed to border portions of area 4 and 5 for example by adhesive connections.

For better handling of the device 1, it is advantageous to put card 2 into slot 23 of a plug-in strip 22 as demonstrated in FIG. 1. For increase of stability of card 2, a strip of carton may be attached on the rear side of card 2.

I claim:

1. A device for training of differentiation, comprising in combination:

a card having a front surface, a back surface, and a border edge, said front surface including a plurality of question symbols arranged in a first section and a plurality of proposed answer symbols arranged in a second section, each of said question symbols presenting a question to be answered, each said proposed answer symbols being colored differently and representative of different proposed answers to said questions, said back surface including correct answer symbols is alignment with said question symbols and being colored the same as one of the proposed answer symbols; and a plurality of clamps having two portions for removable clamping on opposing sides of said card about said border edge and being colored the same as the colors of said proposed answer symbols, whereby the colors of said clamps represents proposed answers to said question symbols and, when one of said clamps is removably fastened over said border edge of said card in alignment with one of said question symbols on said front surface and with the corresponding said correct answer symbol on said back surface, whether such proposed answer is a correct or incorrect answer to said question symbol on said front surface can be readily visualized by comparing the color of said clamp to the color of the answer symbol of said back surface of said card.

2. The device according to claim 1, wherein said two portions of said clamp are pressed to another by a spring and are rotatable about a link joint.

3. The device according to claim 1, wherein the clamp is made by two webs attached to each other resiliently and being connected to a basic body.

4. The device according to claim 1, wherein said clamp comprises a basic body with two webs being in a parallel arrangement arranged whereby at least one of said webs includes a permanent magnet.

5. The device according to claim 4, wherein said stiffening foil is affixed on said front and back surfaces of said card.

6. The device according to claim 1, further including stiffening foil affixed to said border edges of said card.

7. The device according to claim 1, wherein said stiffening foil is made of book cloth.

8. The device according to claim 1, wherein a bottom of said border edge of said card is removably inserted into a slot of a plug-in strip.

* * * * *